United States Patent [19]
Krumbein

[11] 3,984,179
[45] Oct. 5, 1976

[54] MOTION PICTURE CAMERA WITH SOUND RECORDING MEANS

[75] Inventor: Fritz Krumbein, Stuttgart-Mohringen, Germany

[73] Assignee: Robert Bosch G.m.b.H., Stuttgart, Germany

[22] Filed: Oct. 1, 1975

[21] Appl. No.: 618,313

[30] Foreign Application Priority Data
Oct. 5, 1974 Germany............................ 2447644

[52] U.S. Cl.................................. 352/22; 352/12; 352/25; 352/27; 352/29; 352/174
[51] Int. Cl.²......................................... G03B 31/00
[58] Field of Search................... 352/22, 174, 5, 12, 352/25, 26, 27, 29

[56] References Cited
UNITED STATES PATENTS

| | | | |
|---|---|---|---|
| 3,492,067 | 1/1970 | Matsubara............................ | 352/12 |
| 3,825,327 | 7/1974 | Kosarko.............................. | 352/29 |
| 3,880,504 | 4/1975 | Marvin................................ | 352/27 |

*Primary Examiner*—Monroe H. Hayes
*Attorney, Agent, or Firm*—Michael J. Striker

[57] ABSTRACT

A movie sound camera wherein the motor for the sound shaft of the sound recording unit is started by a self-arresting rotary programming device prior to completion of the circuit of a sound amplifier, and the circuit of the amplifier is completed prior to starting of the motor for the pull down in response to movement of camera release from the idle position. When the release is returned to the idle position, the programming device automatically arrests the motor for the pulldown prior and the motor for the sound shaft subsequent to opening of the amplifier circuit. The programming device further controls the sequence in which the film is pressed against the sound shaft and biased against the second recording head of the recording unit in response to movement of release from the idle position. The programming device forms part of a control unit and is rotated by a motor which is started in response to movement of release to or from the idle position.

23 Claims, 4 Drawing Figures

3,984,179

MOTION PICTURE CAMERA WITH SOUND RECORDING MEANS

BACKGROUND OF THE INVENTION

The present invention relates to motion picture cameras in general, and more particularly to improvements in motion picture cameras which are equipped with means for recording sound on motion picture film during the making of exposures. Still more particularly, the invention relates to improvements in motion picture cameras of the type wherein the film exposing and sound recording units comprise discrete film transporting means.

In presently known motion picture cameras of the above outlined character, the camera release serves to effect movements of parts which must engage the film during the making of exposures and simultaneous recording of sound as well as to actuate all electrical components of the film exposing and sound recording units. Therefore, the movement of camera release from its idle position necessitates the exertion of a relatively large force. This, in turn, renders it difficult, especially for a beginner, to move the release from idle position at the relatively slow speed which is needed to effect various movements of mechanical parts as well as the actuation of electrical components in an optimum sequence. As a rule, such manipulation of the release necessitates much concentration which detracts the operator's attention from the subject or scene to be photographed. Moreover, and since the movement of release from idle position necessitates the exertion of a substantial force, the camera is likely to shake during the making of initial and/or last exposures of a series. If the sequence in which the various operations are started is not an optimum sequence, the start of sound recording does not coincide with the making of first exposure or exposures of a series; as a rule, the recording of sound is delayed so that, during reproduction, the first images are projected without sound.

It was already proposed to reduce the distance between idle and operative positions of the camera release by mounting the mechanical film engaging components of the film exposing and sound recording units in such a way that the distance between their operative and inoperative positions is relatively small or extremely small, i.e., as small as absolutely necessary in order to start the film in operative and to arrest the film in idle position of the release. This creates other problems, especially during threading of film into the motion picture camera, because the distance between cooperating film engaging components of the two units is much too small for rapid and convenient introduction of the leader of fresh film into the film exposing and sound recording units. Therefore, many motion picture cameras which employ a sound recording unit must embody costly and bulky auxiliary features which enable the user to thread a fresh motion picture film with a minimum of delay. For example, it was proposed to place certain film guiding elements on the cover for the film chamber or to couple such elements with the cover in order to provide more room for threading of the film when the cover is held in the open position. All this contributes to bulk, complexity and cost of the camera.

SUMMARY OF THE INVENTION

An object of the invention is to provide a motion picture camera wherein the sequence in which various parts engage the film or are disengaged from the film is not affected by the manner in which the release is actuated to move from or back to idle position.

Another object of the invention is to provide a motion picture camera wherein various movements are started and terminated and various electrical components energized or deenergized in a predetermined sequence irrespective of whether the camera is manipulated by a beginner or by an experienced photographer.

A further object of the invention is to provide a motion picture camera wherein the movement of release to or from the idle position necessitates the exertion of a small force even though such movement invariably triggers the activation or deactivation of many mechanical and/or electrical or electronic parts in an optimum sequence.

An additional object of the invention is to provide a motion picture camera of the above outlined character which is designed to allow for rapid and convenient threading of fresh film or removal of exposed film.

Still another object of the invention is to provide a novel and improved sound recording unit for use in motion picture cameras.

Another object of the invention is to provide a novel and improved control unit which is embodied in the improved camera and insures the starting and/or termination of various movements and/or operations in a predetermined sequence.

The invention is embodied in a motion picture camera which comprises film exposing and sound recording units respectively having first and second film engaging means movable between operative and inoperative positions (the film exposing unit preferably comprises a first film transporting means, such as a pull-down, and a prime mover for the first film transporting means; and the sound recording unit preferably comprises discrete second film transporting means, such as a driven sound shaft and a pressure roller which is movable from inoperative to operative position to thereby press the film against the sound shaft, and a discrete prime mover for the sound shaft of the second film transporting means), a camera release which is movable between idle and second positions, and a self-arresting third unit having control means (e.g., a programming device in the form of a rotary control element) which is operative (a) to automatically effect movements of the first and second film engaging means to operative positions in a predetermined sequence in response to movement of the release to second position, (b) to thereupon prepare the release for rendering the sound recording unit inoperative to movement of the release to idle position, (c) to thereupon render itself inoperative while the release dwells in the second position, (d) to effect movements of first and second film engaging means to inoperative positions in response to movement of release to the idle position, (e) to thereupon prepare the release for operation the control means in response to renewed movement of the release to second position, and (f) to thereupon render itself inoperative while the release dwells in the idle position.

The camera preferably further comprises electrical components (such as a sound amplifier and switch means for opening or completing the circuit of the amplifier) which form part of the sound recording unit and are activatable by the control means in response to movement of the release to second position.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
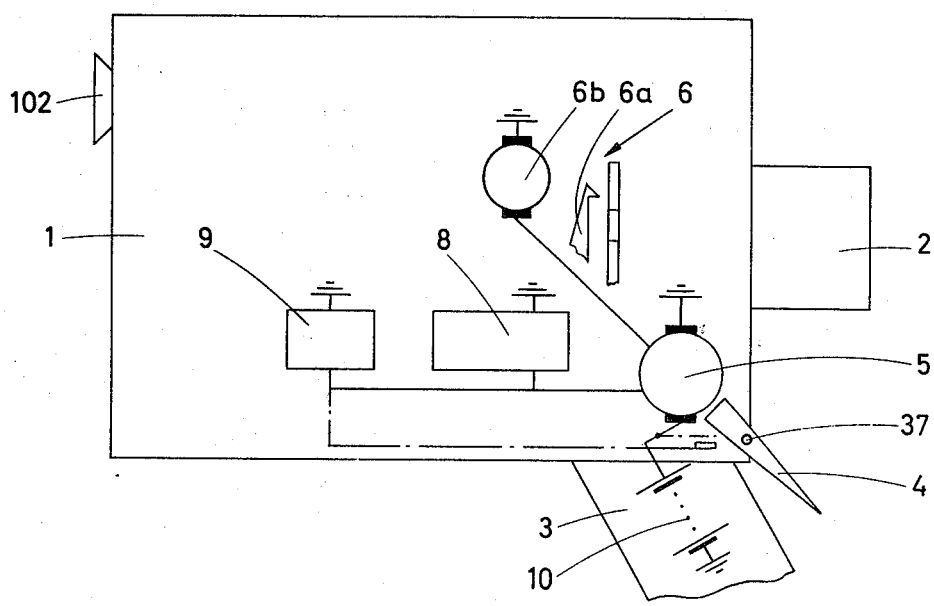
FIG. 1 is a fragmentary diagrammatic elevational view of a motion picture camera which embodies the invention.

FIG. 1 shows a motion picture camera with sound recording means (popularly known as movie sound camera) which comprises a housing or body 1, a picture taking lens 2, a view finder whose rear optical element is shown at 102, a hollow pistol grip handle 3, a release 4, a self-arresting third unit or control unit 5, a film exposing unit 6, a sound recording unit 8 having a sound amplifier 9, and a battery or another suitable source 10 of electrical energy. The energy source 10 is preferably installed in the interior of the handle 3.

Figure 2:
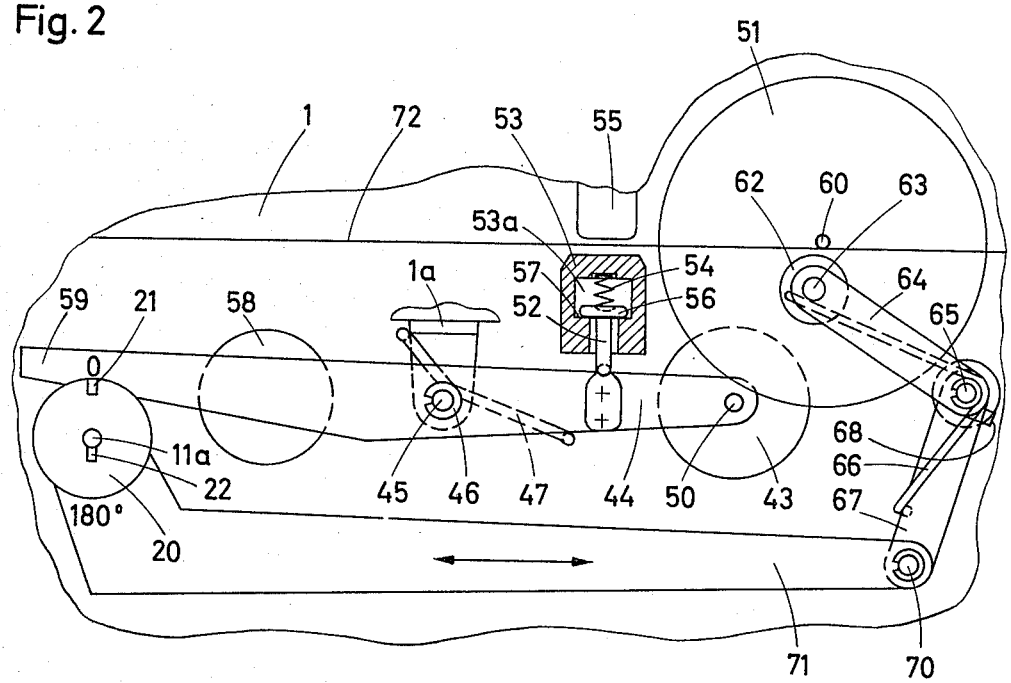
FIG. 2 is a partly elevational and partly vertical sectional view of the control unit.
Figure 3:
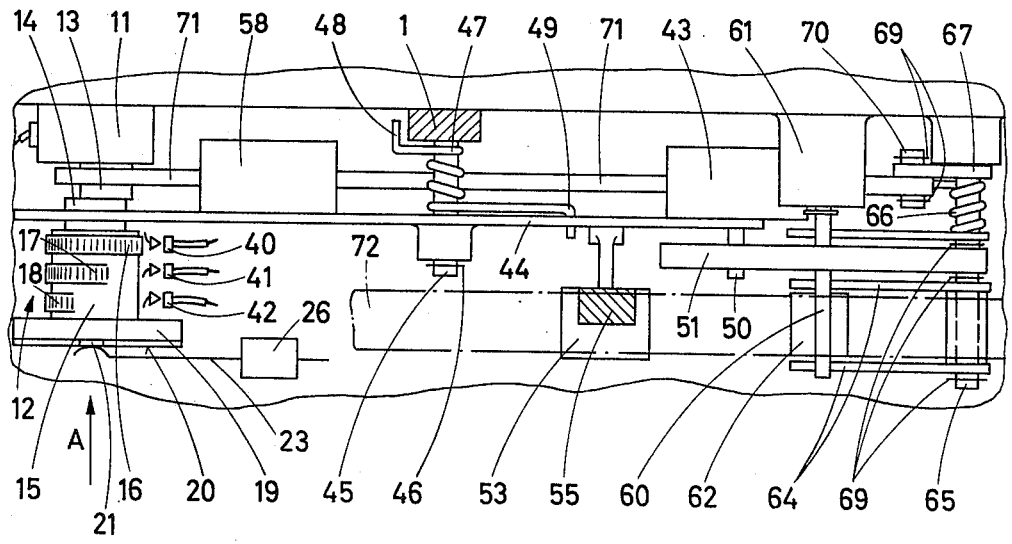
FIG. 3 is a plan view of the structure shown in FIG. 2.

The third unit or control unit 5 further comprises a prime mover 11, preferably a gear motor, having an output shaft 11a (FIGS. 2 and 4) which serves to rotate a programming device or control element 12 best shown in FIG. 3. The control element 12 comprises two eccentric portions 13, 14, a substantially cylindrical or drum-shaped cam 15 with three suitably distributed and configured projections or lobes 16, 17, 18, a disk-shaped contact member 19 having an exposed conductive layer 20 at that end thereof which faces away from the motor 11, and two strip-shaped insulators 21, 22 applied to or embedded in the layer 20. The layer 20 is tracked by three parallel elastic contacts 23, 24, 25 (hereinafter called tongues) of an electric starting switch 26. The distribution of tongues 23-25 is such that the outer tongue 23 is located in the path of movement of the insulator 21 and engages the latter in the zero or starting position (shown in FIGS. 2-4) of the control element 12, that the outer tongue 25 is located in the path of movement of the insulator 22 and engages the latter when the motor 11 rotates the control element 12 through 180° from the zero position of FIGS. 2-4, and that the tongue 24 permanently engages the conductive layer 20 of the contact member 19. The insulators 21, 22 respectively enable the control element to render itself inoperative (by arresting the motor 11) in the zero position and the second position (at 180° from the zero position) of the control element.

Figure 4:
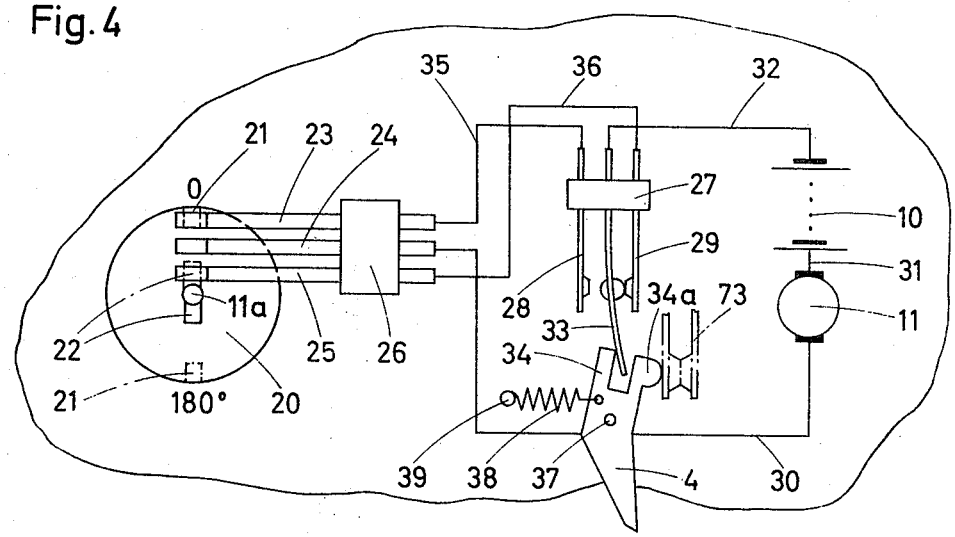
FIG. 4 is an enlarged view of a detail as seen in the direction of arrow A in FIG. 3.

As shown in FIG. 4, the outer tongues 23, 25 of the starting switch 26 of the control unit 5 are connected with the outer contacts 28, 29 of a second starting switch 27 (hereinafter called master switch) which cooperates with the release 4. The median tongue 24 of the starting switch 26 is connected in series with the motor 11 by means of a conductor 30, and the motor 11 is connected in series with one pole of the energy source 10 by a conductor 31. A further conductor 32 connects the other pole of the energy source 10 with the median contact 33 of the master switch 27. When the release 4 is idle, the median contact 33 of the master switch 27 engages the outer contact 28. It will be noted that the median contact 33 is longer than the outer contacts 28, 29 and extends into the bifurcated inner end portion 34 of the release 4 which is pivotable on a pin 37 fixed to the housing 1. A helical return spring 38, one end convolution of which is attached to a post 39 of the housing 1 and the other end convolution of which is attached to the bifurcated end portion 34, tends to pivot the release 4 in a counterclockwise direction, as viewed in FIG. 4, so as to maintain the median contact 33 in engagement with the outer contact 28 while the release dwells in the idle position. The outer tongues 23, 25 of the switch 26 are respectively connected with outer contacts 28, 29 of the master switch 27 by means of conductors 35, 36.

The lobes 16, 17, 18 of the cam 15 constitute trips which respectively serve to actuate normally open electric switches 40, 41, 42 (shown in FIG. 3) in predetermined angular positions of the control element 12. When the switch 40 is closed, it completes the circuit of a prime mover 43 (preferably an electric motor) forming part of the sound recording unit 8 and mounted on one arm of a two-armed oscillatable carrier lever 44. The carrier 44 is pivotable on a fixed shaft 45 which is mounted in the housing 1 and carries a washer or split ring 46 serving to prevent movements of the carrier in a downward direction, as viewed in FIG. 3. That portion of the shaft 45 which extends between the housing 1 and the carrier 44 is surrounded by the helices of a torsion spring 47 serving to bias the carrier in a counterclockwise direction, as viewed in FIG. 2. To this end, one leg 48 of the torsion spring 47 bears against a portion 1a of the housing 1 and the other leg 49 of the spring 47 bears against the one arm of the carrier 44. The purpose of the torsion spring 47 is to urge the output shaft 50 of the motor 43 against the periphery of a friction wheel 51. The one arm of the carrier 44 is further coupled to a holder or link 52 for a film engaging and biasing member 53. The biasing member 53 has an internal chamber 53a for a plunger 56 of the link 52 and a helical spring 54 which reacts against the plunger 56 and bears against the biasing member 53 so as to urge the latter upwardly, as viewed in FIG. 2, toward a sound recording head 55 in the housing 1. When the biasing member 53 is spaced apart from the recording head 55, the spring 54 is free to expand and to maintain the plunger 54 in abutment with an internal shoulder or stop 57 in the chamber 53a.

In order to compensate for the weight of the motor 43 and biasing member 53 in all angular positions of the carrier 44, the other arm of this carrier supports a counterweight 58. The mass of the counterweight 58 and its distance from the axis of the shaft 45 are selected in such a way that the counterweight balances the weight of the motor 43 and biasing member 53 and thus relieves the torsion spring 47. The end portion 59 of the other arm of the carrier 44 abuts against the eccentric portion 14 of the control element 12. The counterweight 58 can be omitted if the motor 11 is mounted on the other arm of the carrier 44, i.e., the motor 11 can constitute a counterweight for the biasing member 53 and motor 43.

The friction wheel 51 is rigid with a film-engaging sound shaft 60 which is rotatable (but cannot move axially) in a bearing 61 secured to the housing 1. The sound shaft 60 extends beyond the friction wheel 51 (see particularly FIG. 3) and is located opposite a film-engaging pressure roller 62 which is rotatable on a stud 63. The stud 63 is secured to one end portion of a bifurcated lever 64 which can turn on a pivot member 65 of the housing 1 and further supports a pivotable lever 67 as well as the helices of a torsion spring 66. The legs of the torsion spring 66 bear against the levers 64, 67 in such a way that the lever 64 tends to urge the pressure roller 62 against the sound shaft 60. The extent to which the levers 64, 67 can pivot relative to each other is determined by a protuberance (e.g., an elongated lug 68) provided on the lever 64 and movable into abutment with an edge face of the lever 67. The pivot member 65 further carries washers or split rings 69 which maintain the levers 64, 67 and the helices of the torsion spring 66 in predetermined positions (as considered axially of the pivot member 65). The free end portion of the lever 67 is coupled to one end portion of a connecting or motion transmitting link 71 by means of a pin 70. The left-hand end portion of the connecting link 71 (as viewed in FIG. 2 or 3) has a circular opening (not shown) for the eccentric 13 of the control element 12.

When properly threaded into the motion picture camera, a portion of the motion picture film 72 extends between the sound recording head 55 and the biasing member 53 as well as between the shaft 60 and roller 62 (see FIG. 2). The parts 60, 62 constitute the film transporting means of the second recording unit 8 and the roller 62 is movable between the inoperative position of FIG. 2 and an operative position in which it engages the film 72 and presses the film against the shaft 60 which is then rotated by the motor 43.

When the lobe 17 of the cam 15 actuates the switch 41, the latter completes the circuit of the sound amplifier 9. The closing of switch 42 by means of the lobe 18 results in completion of the circuit of an electric camera motor 6b constituting the prime mover for the film transporting means of the film exposing unit 6. The film transporting means of the unit 6 includes a pull-down or intermittent 6a which is movable between operative and inoperative positions and is operative to advance the film 72 when the motor 6b is on.

FIG. 4 further shows a normally open switch 73 (indicated by phantom lines) which can be used as substitute for the switch 41 to complete the circuit of the sound amplifier 9 as soon as the release 4 is pivoted from the idle position (contact 33 of master switch 27 engages the contact 28) to the second position of FIG. 4 in which the contact 33 engages the contact 29. The bifurcated end portion 34 of the release 4 has a trip 34a which can close the switch 73.

The operation:

The control element 12 of the third unit or control unit 5 occupies the zero position shown in FIG. 4.

When the user wishes to make exposures simultaneously with recording of sound on the motion picture film 72, the release 4 is pivoted from the idle position to the depressed or second position of FIG. 4 whereby the switches 27, 26 complete the circuit of the motor 11 of the control unit 5 because the median contact 33 of the master switch 27 engages the outer contact 29. The circuit of the motor 11 is completed by way of conductor 30, tongue 24, conductive layer 20, tongue 25, conductor 36, contacts 29, 33, conductor 32, energy source 10 and conductor 31. The motor 11 rotates the control element 12 clockwise from the zero position shown in FIGS. 2–4 whereby the lobe 16 of the cam 15 closes the normally open switch 40 which completes the circuit of the motor 43 of the sound recording unit 8. The eccentric portion 14 moves beyond the end portion 59 of the other arm of the carrier 44 so as to enable the torsion spring 47 to pivot the carrier 44 in a counterclockwise direction, as viewed in FIG. 2, whereby the rotating output shaft 50 of the motor 43 moves into engagement with the periphery of the friction wheel 51 which, in turn, begins to rotate the sound shaft 60. The carrier 44 also causes the link 52 to move upwardly, as viewed in FIG. 2, so that the spring 54 is free to yieldably urge the biasing member 53 against the film 72 opposite the sound recording head 55.

During the next-following stage of rotation of control element 12 from the zero position, its eccentric portion 13 moves the connecting link 71 in a direction to the left, as viewed in FIG. 2, whereby the levers 67, 64 (which move as a unit due to the action of torsion spring 66) pivot clockwise about the axis of the pivot member 65 so that the roller 62 assumes its operative position and presses the adjacent portion of film 72 against the sound shaft 60. At the same time, the lobe 17 of the cam 15 closes the normally open switch 41 to complete the circuit of the amplifier 9. During the last stage of rotation of the control element 12, the lobe 18 of the cam 15 closes the normally open switch 42 to thereby complete the circuit of the camera motor 6b which renders the pull-down 6a operative so that successive frames of the film 72 are placed into register with the picture taking lens 2. Thus, the film exposing and sound recording units 6, 9 operate in synchronism and the sequence in which the prime movers 11, 43, 6b are started is totally independent of the speed at which the user pivots the release 4 to the second position shown in FIG. 4. In other words, the motor 11 is started before the motor 43, and the latter is started prior to starting of the motor 6b irrespective of whether or not the pivoting of release 4 from idle position takes place abruptly or gradually. Moreover, the force which is necessary to start the prime movers 11, 43, 6b in a predetermined sequence need not exceed that force which is required to actuate the release of a conventional motion picture camera without sound recording means.

When the control element 12 completes one-half of a revolution, the insulators 21, 22 on the contact member 19 assume the broken-line positions of FIG. 4. Thus, the tip of the tongue 25 engages the insulator 22 to thereby open the circuit of the motor 11 so that the control element 12 renders itself inoperative by coming to a full stop in a second position at an angle of 180 degrees with respect to the zero position. The control element 12 remains in such position as long as the release 4 remains in the second position of FIG. 4 whereby the switches 40, 41, 42 respectively insure that the circuits of the motor 43, amplifier 9 and motor 6b remain completed. Thus, the camera continues to make exposures and to record sound but the control element 12 has prepared the release 4 for rendering the units 6 and 8 inoperative in response to movement of release to its idle position.

In order to terminate or interrupt the making of exposures and the operation of sound recording unit 8, the user of the camera simply relaxes or terminates the pressure upon the release 4 so that the spring 38 is free to contract and to cause the bifurcated end portion 34 of the release to move the median contact 33 of the master switch 27 against the outer contact 28. This completes the circuit of the motor 11 by way of conductor 30, tongue 24, conductive layer 20, tongue 23 (because the insulator 21 dwells in the broken-line position of FIG. 4), conductor 35, contacts 28, 33, conductor 32, energy source 10 and conductor 31. The motor 11 then rotates the control element 12 through 180° back to the zero position of FIGS. 2–4 and is automatically arrested as soon as the element 12 reassumes the zero position because the tip of the tongue 23 engages the insulator 21 which latter returns to the position shown in FIG. 2. During the just described rotation of control element 12 through 180°, the lobes 18, 17, 16 of the cam 15 are respectively disengaged from and allow the switches 42, 41, 40 to open whereby the motor 6b is arrested (so that the pull-down 6a becomes inoperative) prior to opening of the circuit of amplifier 9 and such opening of the circuit of amplifier 9 precedes stoppage of the motor 43. Furthermore, the eccentric 14 causes the carrier 44 to move the output shaft 50 away from the friction wheel 51 and to disengage the biasing member 53 from the film 72. The eccentric 13 causes the connecting link 71 to move in a direction to the right, i.e., back to the position shown in FIG. 2, so that the link 71 pivots the lever 67 counterclockwise and the lever 67 pivots the lever 64 in the same direction to disengage the pressure roller 62 from the film 72 and the film from the sound shaft 60, i.e., the roller 62 reassumes its inoperative position before the control element 12 renders itself inoperative by moving the insulator 21 into register with the tongue 23. The release 4 is prepared to operate the control unit 5 in response to renewed movement to the second position shown in FIG. 4.

It will be seen that the element 12 of the control unit 5 automatically reassumes the zero position when the pressure upon the release 4 is relaxed sufficiently to allow the bifurcated end portion 34 to engage the median contact 33 of the master switch 27 with the outer contact 28 under the action of return spring 38.

The distance between the inoperative (shown) and operative positions of the pressing roller 62 and biasing member 53 is preferably such that the film 72 can be readily threaded between the recording head 55 and sound shaft 60 on the one hand and the biasing member 53 and roller 62 on the other hand when the parts 53, 62 assume their inoperative positions.

An important advantage of the improved motion picture camera is that, once the user has moved the release to the second position shown in FIG. 4, the user cannot influence the sequence in which the mechanical film engaging parts are moved to operative positions and/or in which various electric circuits are completed because the motor 11 is started in automatic response to such movement of the release and comes to a halt only when the control element or programming device 12 completes one-half of a revolution. The same applies for movements and other functions which are performed when the user decides to allow the release to return to the idle position, i.e., the motor 11 is started again and comes to a halt only when the control element 12 reassumes its zero position. In other words, the pressure roller 62 must be disengaged from the film 72 (by returning to its inoperative position) whenever the release 4 has moved to its idle position, and the biasing member 53 must be moved to inoperative position when the release maintains the median contact 33 of the master switch 27 in engagement with the outer contact 28. This is highly desirable because the sound shaft 60 could not be accelerated in an optimum manner if it were to be operatively connected with the motor 43 while in strong frictional engagement with film 72 due to the fact that the pressure roller 62 dwells in the operative position.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a motion picture camera, a combination comprising film exposing and sound recording units respectively having first and second film engaging means movable between operative and inoperative positions; a release movable between idle and second positions; and a self-arresting third unit having control means operative to automatically effect movements of said film engaging means to said operative positions in a predetermined sequence in response to movement of said release to said second position, to thereupon prepare said release for rendering said sound recording unit inoperative in response to movement of said release to said idle position, and to thereupon render itself inoperative while said release dwells in said second position.

2. A combination as defined in claim 1, wherein said film exposing and sound recording units respectively comprise discrete first and second film transporting means and discrete first and second prime movers for the respective film transporting means.

3. A combination as defined in claim 1, further comprising electrical components forming part of said sound recording unit and being activatable by said control means in response to movement of said release to said second position.

4. A combination as defined in claim 1, wherein said control means is further operative to effect movements of said film engaging means to said inoperative positions in response to movement of said release to said idle position, to thereupon prepare said release for operating said control means in response to renewed movement of said release to said second position, and to thereupon render itself inoperative while said release dwells in said idle position.

5. A combination as defined in claim 1, wherein said third unit further comprises a first prime mover and means for starting said prime mover in response to movement of said release to said second position to thereby operate said control means, said sound recording unit further comprising a second prime mover which is started by said control means subsequent to starting of said first prime mover, said second film engaging means comprising a sound shaft receiving torque from said second prime mover and means for pressing the film against said sound shaft in response to starting of said first prime mover.

6. A combination as defined in claim 5, wherein said sound recording unit further comprises a sound recording head and means for biasing the film against said recording head in response to starting of said first prime mover.

7. A combination as defined in claim 6, wherein said control means receives motion from said first prime mover and said control means includes devices for actuating said pressing means and said biasing means in response to starting of said first prime mover.

8. A combination as defined in claim 7, wherein said devices are arranged to disengage said pressing means and said biasing means from the film in response to movement of said release to said idle position.

9. A combination as defined in claim 5, wherein said control means is directly coupled with said first prime mover.

10. A combination as defined in claim 5, wherein said second prime mover is an electric motor having a rotary output element and further comprising a carrier pivotable about a fixed axis and having a first arm supporting said motor and a second arm, and a counterweight mounted on said second arm and arranged to balance the weight of said motor.

11. A combination as defined in claim 10, wherein said counterweight includes said first prime mover.

12. A combination as defined in claim 1, wherein said third unit further comprises an electric motor and means for starting said motor in response to movement of said release to said idle or to said second position, said control means receiving torque from said motor and including a contact member having a conductive portion and two insulators on said contact member, said starting means including a switch having a first tongue permanently bearing against said contact member, a second tongue normally bearing against said contact member and engaging one of said insulators in a first predetermined angular position of said control element to thereby open the circuit of said motor, and a third tongue normally bearing against said contact member and engaging the other of said insulators to thereby open the circuit of said motor in a second predetermined angular position of said control means.

13. A combination as defined in claim 12, wherein said starting means further comprises a second switch having first, second and third contacts, said first and second contacts being respectively connected with said second and third tongues and said third contact being movable by said release to respectively engage said first and second contacts in said idle and second positions of said release, said motor circuit being completed when said third contact engages said first or said second contact as long as said second and third tongues are disengaged from the respective insulators.

14. A combination as defined in claim 13, further comprising a source of electrical energy having a first pole connected with said motor and a second pole connected with said third contact, said motor being in series with said tongue.

15. A combination as defined in claim 14, wherein said control means completes one-half of a revolution to move from said first to said second predetermined position.

16. A combination as defined in claim 1, wherein said film exposing unit comprises an electric motor for said first film transporting means and a normally open switch in circuit with said motor, said control means having a portion arranged to respectively open and close said switch in response to movement of said release to said idle and second positions.

17. A combination as defined in claim 1, wherein said sound recording unit further comprises a sound amplifier and a normally open switch in circuit with said amplifier, said control means comprising a portion arranged to respectively close and open said switch in response to movement of said release to said second and idle positions.

18. A combination as defined in claim 1, wherein said sound recording unit further comprises an amplifier and a normally open switch in circuit with said amplifier, said release having means for closing said switch in response to movement of said release to said second position.

19. A combination as defined in claim 1, wherein said film exposing unit comprises a first motor for said first film transporting means and said sound recording unit comprises a second motor for said second film transporting means, a sound amplifier and a normally open switch in circuit with said amplifier, said control means including portions arranged to close said switch prior to starting of said first motor and subsequent to starting of said second motor.

20. A combination as defined in claim 19, wherein said second film transporting means comprises a sound shaft receiving torque from said second motor and means for pressing the film against said shaft, said pressing means receiving motion from said control means to urge the film against said shaft subsequent to starting of said second motor and prior to starting of said first motor.

21. A combination as defined in claim 20, wherein said sound recording means further comprises a sound recording head and means for biasing the film against said head, said biasing means receiving motion from said control means prior to starting of said first motor and subsequent to starting of said second motor.

22. A combination as defined in claim 21, wherein said control means is arranged to arrest said first motor prior to opening of said switch and prior to arresting of said second motor in response to movement of said release to said idle position.

23. A combination as defined in claim 1, wherein said second film transporting means comprises a sound shaft and a pressure member movable between said operative and inoperative positions to respectively urge the film against and to move away from said shaft, said sound recording unit further comprising a prime mover for said shaft, means for starting said prime mover by way of said control means in response to movement of said release to said second position, a sound recording head, means for biasing the film against said head, said biasing means being movable between operative and inoperative positions in which said biasing means respectively urges the film against and is spaced apart from said head, and further comprising means for moving said pressing means and said biasing means to said operative positions in response to movement of said release to said second position and to said inoperative positions in response to movement of said release to said idle position, the distance between the operative and inoperative positions of said pressing and biasing means being such that, in the inoperative positions of said pressing and biasing means, the film can be readily threaded between said sound shaft and said head on the one hand and said pressing and biasing means on the other hand.

\* \* \* \* \*